United States Patent
Raman et al.

(10) Patent No.: US 11,281,768 B1
(45) Date of Patent: *Mar. 22, 2022

(54) FIRMWARE SECURITY VULNERABILITY VERIFICATION SERVICE

(71) Applicant: AMERICAN MEGATRENDS INTERNATIONAL, LLC, Norcross, GA (US)

(72) Inventors: Presanna Raman, Suwanee, GA (US); Stefano Righi, Lawrenceville, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 179 days.

This patent is subject to a terminal disclaimer.

(21) Appl. No.: 16/680,477

(22) Filed: Nov. 11, 2019

Related U.S. Application Data

(63) Continuation of application No. 15/499,505, filed on Apr. 27, 2017, now Pat. No. 10,489,582.

(51) Int. Cl.
| | | |
|---|---|---|
| *G06F 21/00* | (2013.01) | |
| *G06F 21/53* | (2013.01) | |
| *G06F 21/51* | (2013.01) | |
| *G06F 8/65* | (2018.01) | |

(Continued)

(52) U.S. Cl.
CPC ............... *G06F 21/53* (2013.01); *G06F 8/65* (2013.01); *G06F 11/3612* (2013.01); *G06F 21/51* (2013.01); *G06F 21/57* (2013.01); *G06F 21/577* (2013.01)

(58) Field of Classification Search
CPC ........ G06F 21/53; G06F 21/577; G06F 21/57; G06F 21/51
See application file for complete search history.

(56) References Cited

U.S. PATENT DOCUMENTS

| | | | |
|---|---|---|---|
| 9,898,391 B1* | 2/2018 | Morice | G06Q 30/0239 |
| 2014/0173105 A1* | 6/2014 | Sarfati | H04L 67/26 |
| | | | 709/224 |
| 2018/0157842 A1* | 6/2018 | Holz | G06F 21/577 |

OTHER PUBLICATIONS

USPTO Non Final Office Action dated Jan. 24, 2019 in U.S. Appl. No. 15/499,505, Firmware Security Vulnerability Verification Service, first named inventor: Presanna Raman, 14 pp.

(Continued)

*Primary Examiner* — Alexander Lagor
(74) *Attorney, Agent, or Firm* — Newport IP, LLC; Leonard J. Hope

(57) ABSTRACT

A firmware security vulnerability verification service provides functionality for verifying the presence or absence of security vulnerabilities in firmware source code and firmware. The service can generate a white box testing application to test for the presence of security vulnerabilities using revoke operations on the firmware source code. The white box testing application can report the results of the revoke operations to the service. The service can also generate a black box testing application. The black box testing application can obtain modules for testing the firmware for the presence of security vulnerabilities. The black box testing application can then execute the modules to test the firmware. The results of the black box testing can also be reported back to the network service. The network service can then make the results of the white and black box testing available to a user of the service.

20 Claims, 8 Drawing Sheets

(51) Int. Cl.
*G06F 11/36* (2006.01)
*G06F 21/57* (2013.01)

(56) References Cited

OTHER PUBLICATIONS

USPTO Notice of Allowance dated Jul. 10, 2019 in U.S. Appl. No. 15/499,505, Firmware Security Vulnerability Verification Service, first named inventor: Presanna Raman, 8 pp.

* cited by examiner

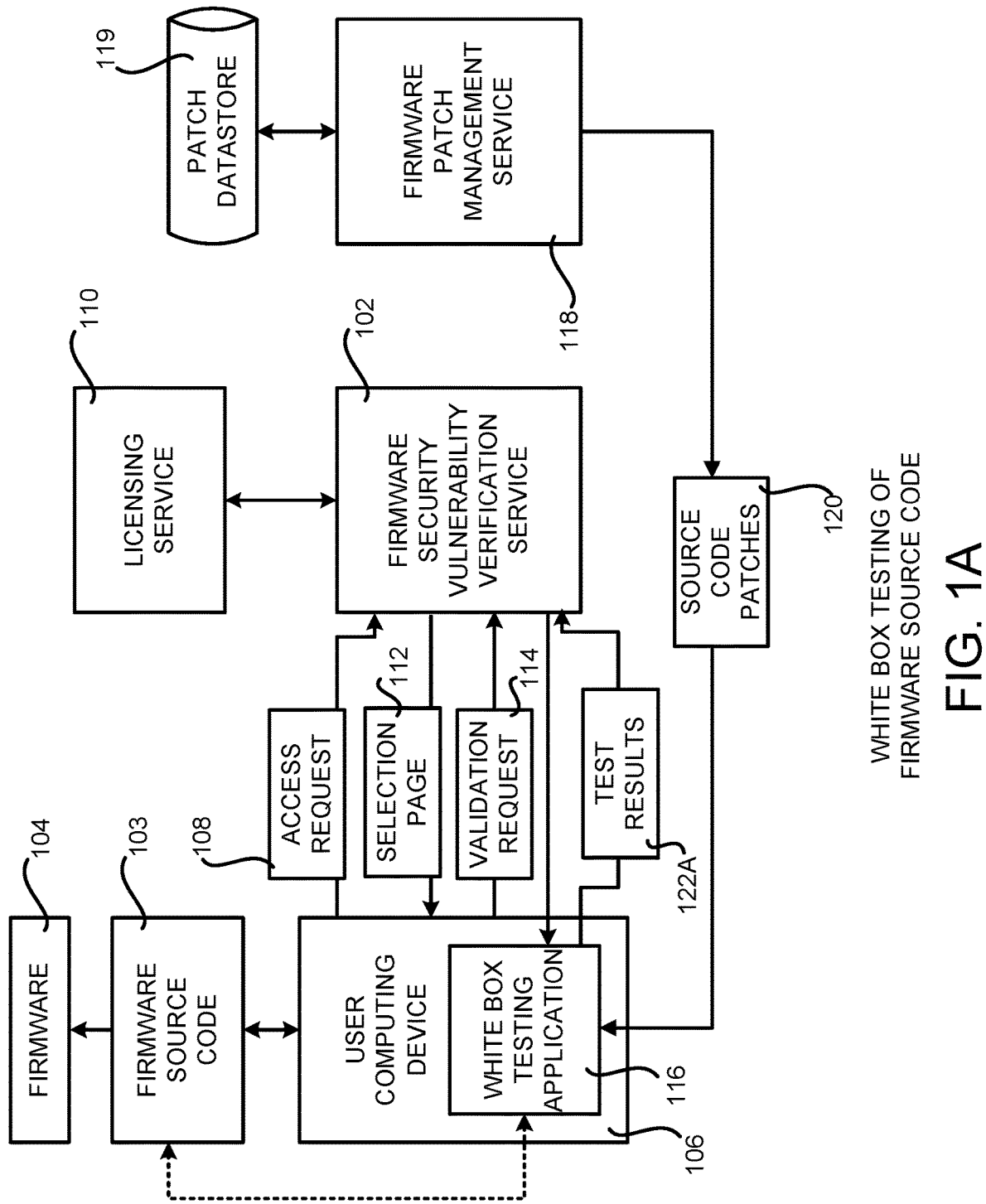

BLACK BOX TESTING OF FIRMWARE

FIRMWARE SECURITY VULNERABILITY VERIFICATION SERVICE

CROSS-REFERENCE TO RELATED APPLICATION

This application is a continuation of U.S. patent application Ser. No. 15/499,505, filed Apr. 27, 2017, the content of which application is expressly incorporated herein by reference in its entirety.

BACKGROUND

Computer system firmware can be extremely complex. For example, the source code for a firmware for a modern computing system can be in excess of a million lines of source code. At the same time, because computer system firmware is the root of trust for a computing system, it is imperative that the firmware be completely free from security vulnerabilities. A security vulnerability is an unintended flaw in a firmware that leaves the firmware open to the potential for exploitation in the form of unauthorized access or malicious behavior, such as viruses, worms, Trojan horses, or other forms of malware.

It is not uncommon today for security researchers or other types of users to identify security vulnerabilities within computer system firmware. Identified security vulnerabilities can be publicly reported or reported directly to the developer of the firmware. In response to receiving a report of a security vulnerability, the developer of the firmware can create a patch to the source code of the firmware that addresses the security vulnerability. Given the size and complexity of the source code for a firmware, the possibility of numerous versions and configurations of firmware, and the potentially large number of security vulnerabilities, it can, however, be difficult to identify the patches that have, and have not, been applied to a particular version of a computer system firmware.

It is with respect to these and other considerations that the disclosure made herein is presented.

SUMMARY

Technologies are described herein for providing a firmware security vulnerability verification service. Through an implementation of the technologies presented herein, a network service can be provided that automates the process of verifying that patches for security vulnerabilities have, or have not, been applied to firmware source code. By automating the process for verifying that firmware security vulnerabilities have been patched through the use of the disclosed network service, firmware security vulnerability patches can be verified more quickly, thereby saving processing cycles, power, and potentially other computing resources. Verification of the application of patches for firmware security vulnerabilities using a network service can also provide a more secure firmware than previously possible utilizing manual verification methods. Other technical benefits can also be realized through an implementation of the disclosed technologies.

In one particular implementation, a firmware security vulnerability verification service (which might be referred to herein simply as "the service" or "the network service") is provided that automates white box and black box testing of firmware source code and firmware, respectively, to verify that known security vulnerabilities have been patched. In order to utilize the functionality provided by the service, a user, such as a firmware developer, can utilize an appropriate computing device to establish a connection to the service. For example, and without limitation, a web browser application can be utilized in some configurations to connect to a web interface provided by the service.

Once connected to the web interface, the user may submit a request to access the functionality provided by the service. In response to receiving such a request, the service can query a licensing service to determine whether the user is authorized to utilize the functionality provided by the network service. If the user is authorized to utilize the network service, the user computing device can be provided with a selection page through which the user can specify the type, or types, of verification that is to be performed and to provide other parameters for use during verification. For example, and without limitation, the user can identify the firmware and firmware source code to be verified, specify whether white box testing and/or black box testing is to be performed and can identify the particular security vulnerabilities that are to be verified. Once the user has made the desired selections on the selection page, the user can submit a request to the network service to initiate validation of the identified firmware.

In response to receiving a request to identify the security vulnerabilities in a firmware, the network service can generate one or more white box testing applications for performing white box testing on the firmware source code for the security vulnerabilities. The network service can also generate one or more black box testing applications for performing black box testing on the firmware for the security vulnerabilities. A response can then be provided back to the user computing device that includes the white box testing application and the black box testing application.

When the white box testing application is executed on the user computing device, the white box testing application is configured to obtain source code patches associated with the identified firmware security vulnerabilities. The patches can be obtained from a network firmware patch management service or another type of network service or location. The white box testing application then verifies the existence of the patches in the source code under test. For example, in one configuration the white box testing application executes operations for revoking the patches on the firmware source code. If a revoke operation fails, this indicates that the security vulnerabilities have not been patched in the firmware source code and are still present. If a revoke operation succeeds, this indicates that the associated security vulnerability has been previously patched. The white box testing application can then provide the results of the revoke patch operations to the network service.

When the black box testing application is executed on the user computing device, or another system under test, the black box testing application is configured to obtain modules for testing the firmware for the presence of the identified security vulnerabilities. The modules might, for instance, be obtained from a network service or other storage location. The black box testing application executes the modules to test the firmware for the security vulnerabilities. Results of the tests performed by the modules can then be transmitted to the network service. The network service can then provide the results of the white box testing and the black box testing to the user computing device.

It is to be appreciated that the above-described subject matter can also be implemented as a computer-controlled apparatus, a computer process, a computing system, or as an article of manufacture such as a non-transitory computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1A is a software architecture diagram that illustrates aspects of the configuration and operation of a firmware security vulnerability verification service for performing white box testing, according to one particular configuration;

DETAILED DESCRIPTION

Figure 1B:
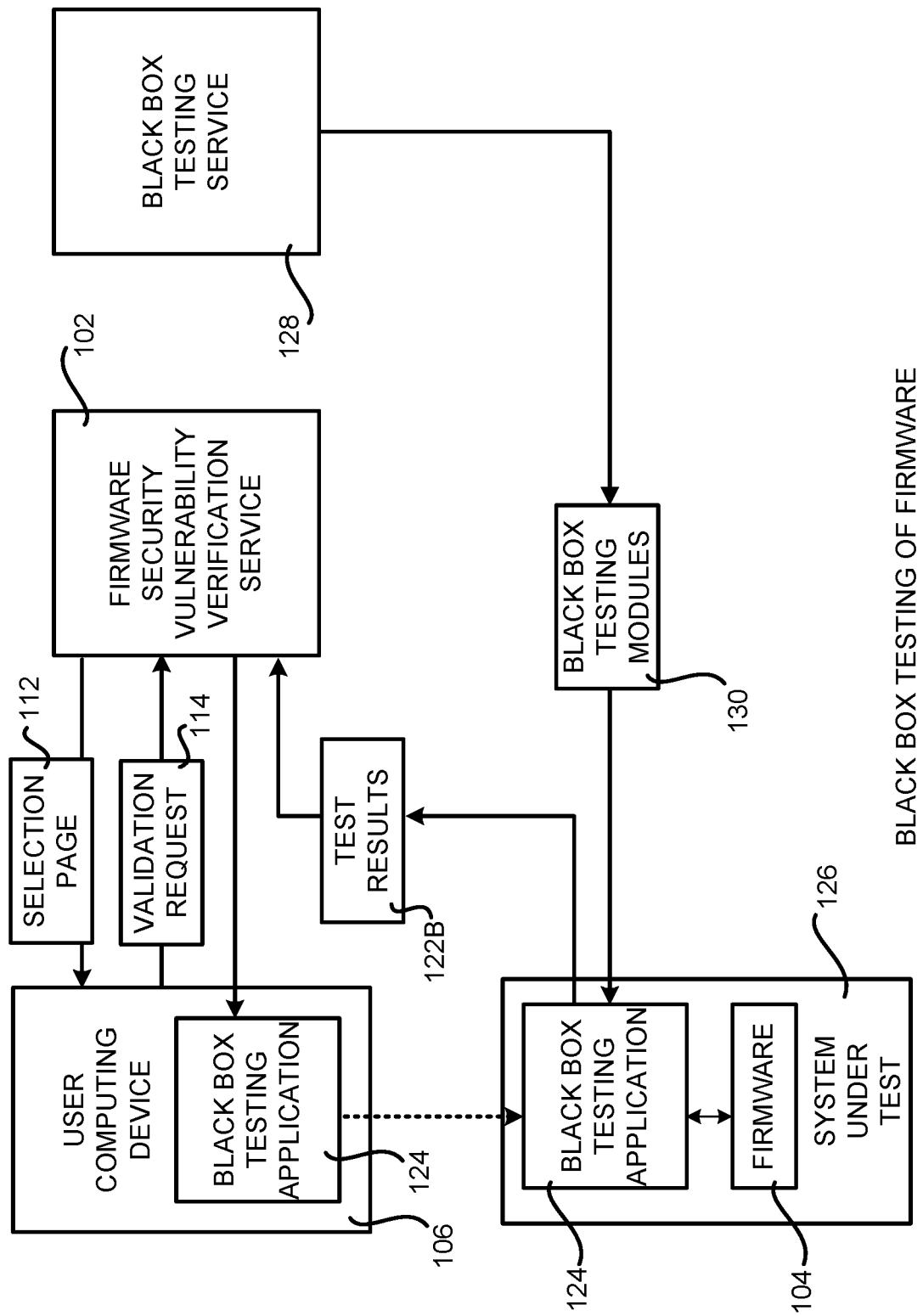
FIG. 1B is a software architecture diagram that illustrates aspects of the configuration and operation of the firmware security vulnerability verification service shown in FIG. 1A for performing black box testing, according to one particular configuration.

Technologies for providing a firmware security vulnerability verification service are disclosed herein. In the following detailed description, references are made to the accompanying drawings that form a part hereof, and in which are shown by way of illustration specific configurations or examples. Referring now to the drawings, in which like numerals represent like elements throughout the several FIGS., aspects of an exemplary operating environment and the various technologies provided herein will be described.

While the configurations presented herein are described in the general context of program modules that execute in conjunction with the execution of a computer firmware, those skilled in the art will recognize that various configurations can also be implemented in combination with other program modules. Generally, program modules include routines, programs, components, data structures, and other types of structures that perform particular tasks or implement particular abstract data types. Moreover, those skilled in the art will appreciate that the invention can be practiced with other computer system configurations, including handheld devices, multiprocessor systems, microprocessor-based or programmable consumer electronics, minicomputers, mainframe computers, embedded systems, and the like. Configurations presented herein can also be practiced in distributed computing environments where tasks are performed by remote processing devices that are linked through a communications network. In a distributed computing environment, program modules can be located in both local and remote memory storage devices.

FIG. 1A is a software architecture diagram that illustrates aspects of the configuration and operation of a firmware security vulnerability verification service 102 (which might be referred to herein simply as "the service 102" or "the network service 102") for performing white and black box testing to verify that known security vulnerabilities have been patched in source code 103 for a firmware 104. As discussed briefly above, a security vulnerability is an unintended flaw in a firmware 104 that leaves the firmware 104 open to the potential for exploitation in the form of unauthorized access or malicious behavior such as, but not limited to, viruses, worms, Trojan horses, or other forms of malware.

As also described briefly above, it is not uncommon for security researchers or other types of users to identify security vulnerabilities within firmware 104. Identified security vulnerabilities can be publicly reported or reported directly to the developer of the firmware 104. In response to receiving a report of a security vulnerability, the developer of the firmware 104 can create a patch to the firmware source code 103 that addresses the security vulnerability. Given the size and complexity of the source code 103 for a firmware 104, the possibility of numerous versions and configurations of firmware 104, and the potentially large number of security vulnerabilities, it can, however, be difficult to identify the patches that have, and have not, been applied to a particular version of a computer system firmware source code 103.

As also described briefly above, in order to address the considerations set forth above, and potentially others, the network service 102 provides functionality for performing white box and black box testing on the firmware source code 103 and the firmware 104, respectively, to verify whether security vulnerabilities in the source code 103 have been patched or not. FIG. 1A illustrates aspects of the operation of the network service 102 for performing white box testing and FIG. 1B illustrates aspects of the operation of the network service 102 for performing black box testing.

In order to utilize the functionality provided by the service 102, a user, such as a firmware developer, can utilize an appropriate user computing device 106 to establish a connection to the service 102. For example, and without limitation, a web browser application (not shown in FIG. 1A) can be utilized in some configurations to connect to a web interface (also not shown in FIG. 1A) provided by the service 102. The user computing device 106 can be a laptop computer, a desktop computer, a server computer, or another type of computing device capable of making a network connection to a network service.

Once connected to the web interface provided by the service 102, the user of the user computing device 106 may submit a request 108 to access the functionality provided by the service 102. The access request 108 might, for instance, include credentials (e.g. a username and password) assigned to the user for accessing the network service 102.

In response to receiving an access request 108, the service 102 can query a licensing service 110 to determine whether the user is authorized to utilize the functionality provided by the network service 102. The licensing service 110 can maintain data identifying users and their permitted level of access to the network service 102 and/or other services.

If the user of the user computing device 106 is authorized to utilize the network service 102, the service 102 can transmit a selection page 112 to the user computing device 106. The selection page 112 can include user interface ("UI") controls through which the user can specify the type, or types, of security vulnerability verification that is to be performed and to provide other parameters for use during verification. For example, and without limitation, the user can identify a location of the firmware 104 and firmware source code 103 to be verified, specify whether white box testing and/or black box testing is to be performed, and can identify the particular security vulnerabilities that are to be verified. Once the user has made the desired selections on the selection page 112, the user can submit a request 114 to the network service 102 to initiate validation of the identified firmware 104.

In response to receiving the request 114 to identify the security vulnerabilities in the firmware 104, the network service 102 can generate a white box testing application 116 for performing white box testing on the firmware source code 103 for the identified security vulnerabilities. As known to those skilled in the art, white box testing generally refers to testing that requires knowledge of and access to the source code 103 being tested. In this instance, white box testing involves analyzing the firmware source code 103 for the presence of known solutions, referred to herein as "patches" or a "patch", for a security vulnerability.

The white box testing application 116 is a customized executable application that can verify the presence or absence of the identified security vulnerabilities in the firmware source code 103. In one particular implementation, the service 102 customizes the white box testing application 116 by adding identifiers to the application 116 for the security vulnerabilities that are to be verified. Once the white box testing application 116 has been created, it is transmitted to the user computing device 106 for execution.

When the white box testing application 116 is executed on the user computing device 106, the white box testing application 116 obtains source code patches 120 for the identified firmware security vulnerabilities. In one configuration, the white box testing application 116 obtains the source code patches 120 from a network firmware patch management service 118 or another type of network service or location. The firmware patch management service 118 maintains the source code patches 120 along with data identifying the security vulnerability that each of the patches 120 addresses.

Once the white box testing application 116 has obtained the appropriate source code patches 120, the white box testing application 116 then executes operations for revoking the patches 120 on the firmware source code 103. If a revoke operation fails, this indicates that the corresponding security vulnerability has not been patched in the firmware source code 103. If, however, a revoke operation succeeds, this indicates that the associated security vulnerability has been previously patched in the firmware source code 103.

Once testing is complete, the white box testing application 116 can provide the results 122A of the revoke patch operations to the network service 102. In turn, the network service 102 can provide the test results 122A to the user of the user computing device 106, such as on a web page.

FIG. 1B is a software architecture diagram that illustrates aspects of the configuration and operation of the firmware security vulnerability verification service 102 shown in FIG. 1A for performing black box testing, according to one particular configuration. As known to those skilled in the art, black box testing generally refers to testing that does not require access to the source code 103 for the firmware 104 being tested. In this instance, black box testing involves testing the firmware 104 directly for the presence of a known security vulnerability.

In order to enable black box testing to be performed on the firmware 104, the network service 102 can also generate a black box testing application 124 for performing black box testing on the firmware 104 to determine the presence or absence of the identified security vulnerabilities. The black box testing application 124 is a customized executable application that can verify the presence or absence of the identified security vulnerabilities in the firmware 104. In one particular implementation, the service 102 customizes the black box testing application 124 by adding identifiers to the application 124 for the security vulnerabilities that are to be verified. As discussed in greater detail below, the black box testing application 124 can utilize the identifiers to obtain modules 130 for testing the firmware 104 for the identified security vulnerabilities. Once the black box testing application 124 has been created, it is transmitted to the user computing device 106.

As shown in FIG. 1B, the black box testing application 124 can be moved from the user computing device 106 to a system under test ("SUT") 126 that is executing the firmware 104 to be tested. For example, the black box testing application 124 can be stored on a Universal Serial Bus ("USB") key or another type of portable mass storage device for migration to the SUT 126. In some configurations, the SUT 126 can obtain the black box testing application 124 directly from the network service 102. Once the black box testing application 124 has been stored on the SUT 126, the black box testing application 124 can be executed.

When the black box testing application 124 is executed on the SUT 126 the black box testing application 124 obtains testing modules 130 for testing the firmware 104 for the identified firmware security vulnerabilities. In one configuration, the black box testing application 124 obtains the black box testing modules 130 from a network black box testing service 128 or another type of network service or location. The black box testing service 128 is a network service that maintains the black box testing modules 130 along with data identifying the security vulnerability that each of the black box testing modules 130 tests for.

Once the black box testing application 124 has obtained the appropriate black box testing modules 130, the black box testing application 124 then executes the testing modules 130 for testing the firmware 104 for the presence of the identified security vulnerabilities. Once testing is complete, the black box testing application 124 can provide the results 122B of the execution of the testing modules 130 to the network service 102. In turn, the network service 102 can provide the test results 122B to the user of the user computing device 106, such as on a web page. Additional details regarding the operation of the network service 102 will be provided below with regard to FIGS. 2-4.

Figure 2:
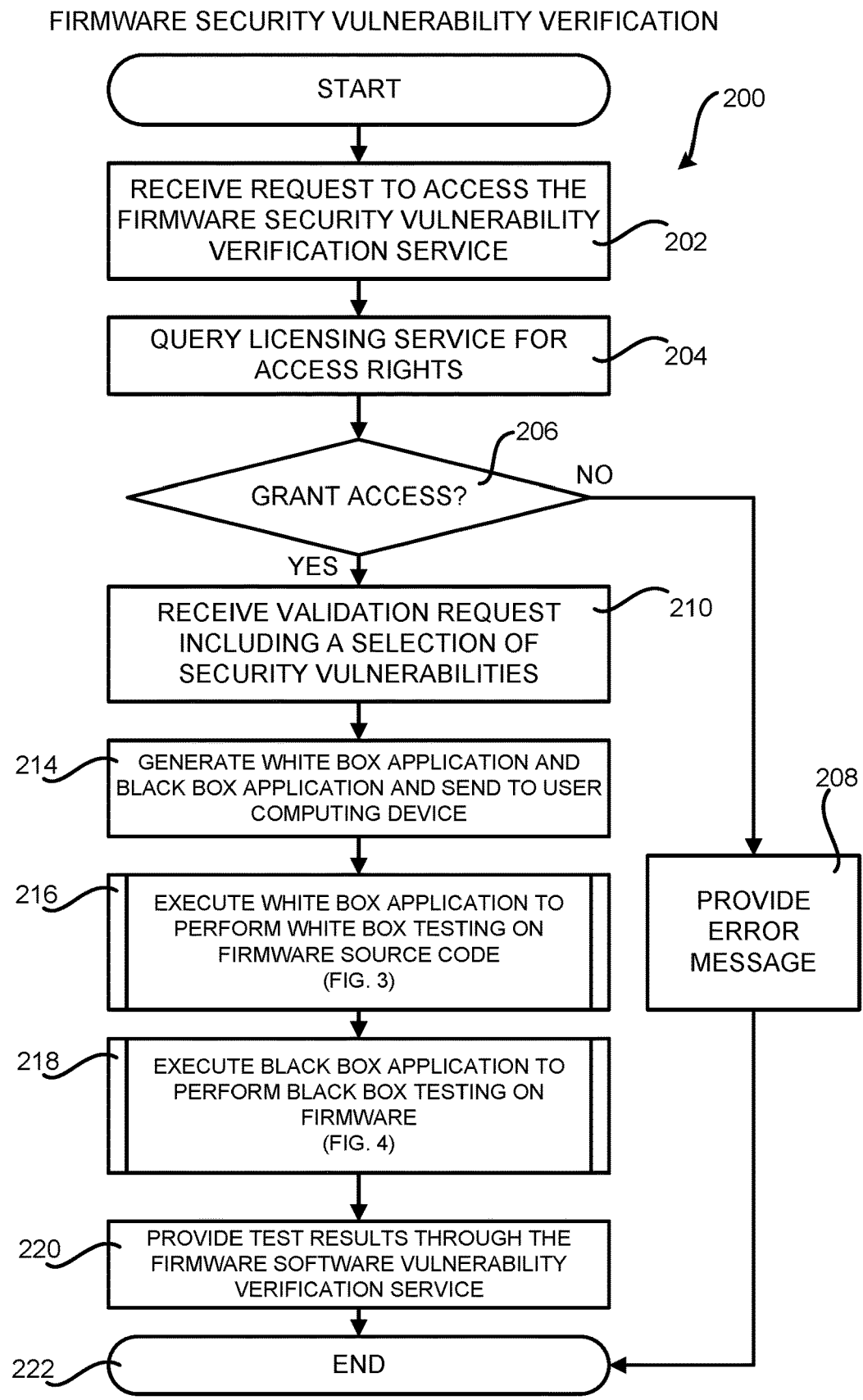
FIG. 2 is a flow diagram that illustrates aspects of the operation of the firmware security vulnerability verification service shown in FIGS. 1A and 1B for performing firmware security vulnerability verification, according to one particular configuration.

FIG. 2 is a flow diagram showing a routine 200 that illustrates aspects of the operation of the firmware security vulnerability verification service 102 shown in FIGS. 1A and 1B for performing firmware security vulnerability verification, according to one particular configuration. It should be appreciated that the logical operations described herein with regard to FIG. 2 and the other FIGS. are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

The routine 200 begins at operation 202, where the network service 102 receives a request 108 to access the functionality it provides for verifying firmware 104 and source code 103. In response to receiving such a request 108, the routine 200 proceeds to operation 204, where the network service 102 queries the licensing server 110 to determine whether the request 108 is to be granted. If the access request 108 is not to be granted, the routine 200 process from operation 206 to operation 208 where the network service 102 can return an error message 208 in response to the request 108. If the access request 108 is to be granted, the routine 200 proceeds from operation 206 to operation 210.

At operation 210, the network service 102 provides the selection page 112 to the user computing device 106. As discussed above, the selection page 112 can include UI controls through which the user can specify the type, or types, of security vulnerability verification that is to be performed and to provide other parameters for use during verification. For example, and without limitation, the user can identify a location of the firmware 104 and firmware source code 103 to be verified, specify whether white box testing and/or black box testing is to be performed, and can identify the particular security vulnerabilities that are to be verified. Once the selections have been made on the selection page 112, the selections can be provided to the network service 102 in the validation request 114.

From operation 210, the routine 200 proceeds to operation 214, where the network service 102 generates the white box testing application 116 and the black box testing application 124. The network service 102 then transmits the white box testing application 116 and the black box testing application 124 to the user computing device 106. The routine 200 then proceeds from operation 214 to operation 216.

At operation 216, the user computing device 106 executes the white box testing application 116 and provides the test results 122A to the network service 102. Additional details regarding this process will be provided below with respect to FIG. 3. The routine 200 then proceeds from operation 216 to operation 218, where the black box testing application 124 is executed in order to perform black box testing on the firmware 104. The results 122B are then provided from the black box testing application 116 to the network server 102. Additional details regarding this process will be provided below with regard to FIG. 4.

From operation 218, the routine 200 proceeds to operation 220, where the network service 102 can provide the results 122A and 122B of the white box and black box testing to the user computing device 106. As discussed above, a web interface or another type of interface can be utilized to provide the test results 122A and 122B to the user computing device 106. The routine 200 then proceeds from operation 220 to operation 222, where it ends.

Figure 3:
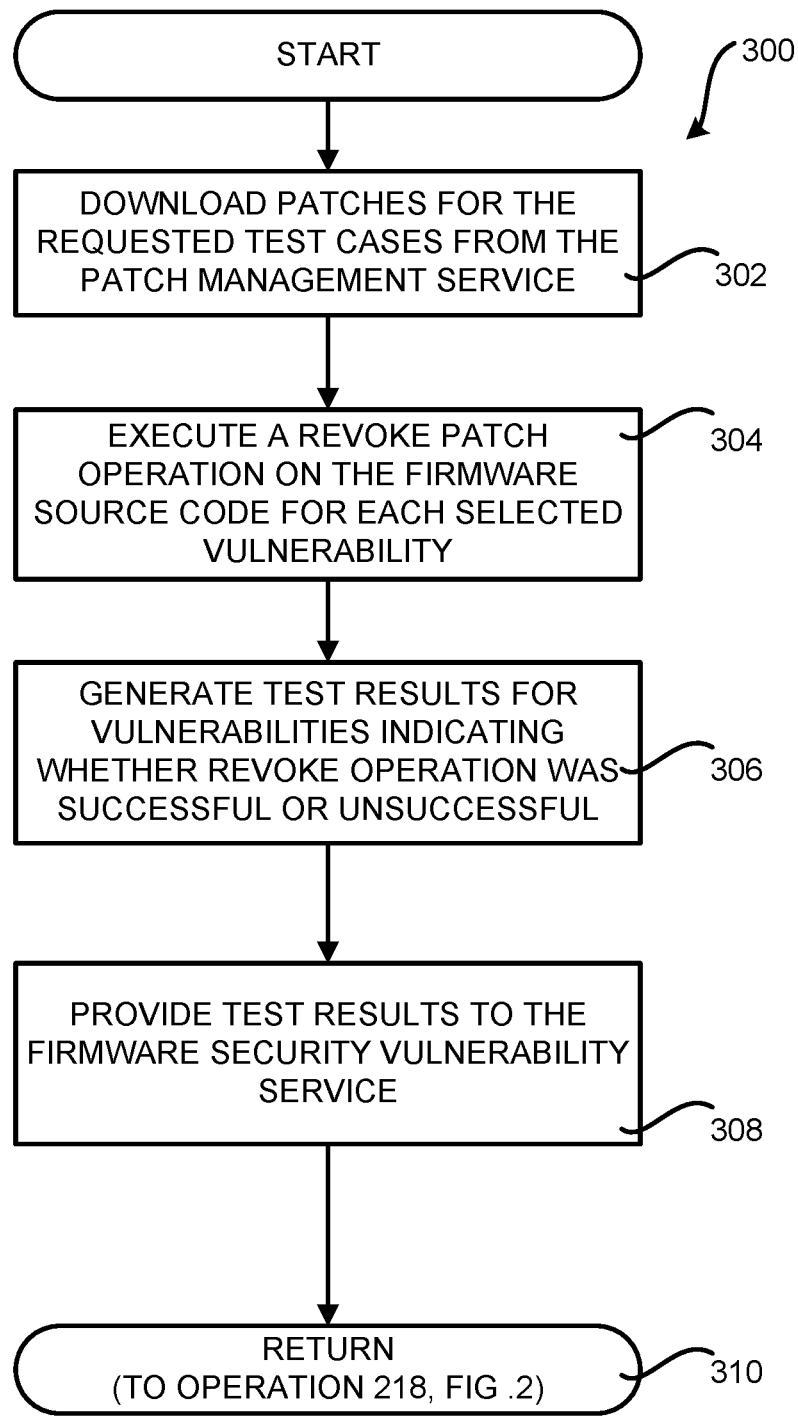
FIG. 3 is a flow diagram that illustrates aspects of the operation of the firmware security vulnerability verification service shown in FIGS. 1A and 1B for performing white box testing on firmware source code, according to one particular configuration.

FIG. 3 is a flow diagram showing a routine 300 that illustrates aspects of the operation of the firmware security vulnerability verification service 102 shown in FIGS. 1A and 1B for performing white box testing on firmware source code 103, according to one particular configuration. In this configuration the white box testing application attempts to revoke patches on the source code under test. It is to be appreciated, however, that this mechanism is only illustrative and that other mechanisms can also be utilized to determine whether patches have been applied to source code.

The routine 300 begins at operation 302, where the white box testing application 116 is executed on the user computing device 106. When executed, the white box testing application 116 retrieves the required source code patches 120 from the firmware patch management server 118. The routine 300 then proceeds from operation 302 to operation 304.

At operation 304, the white box testing application 116 initiates a revoke patch operation on the source code 103 for each selected security vulnerability. The routine 300 then proceeds from operation 304 to operation 306, where the white box testing application 116 generates test results for the tests indicating whether each revoke operation was successful or not. As discussed above, if a revoke operation fails, this indicates that a security vulnerability has not been patched in the firmware source code and is still present. If a revoke operation succeeds, this indicates that the associated security vulnerability has been previously patched.

Once the test results 122A have been generated, the routine 300 proceeds from operation 306 to operation 308, where the white box testing application 116 provides the results 122A of the revoke patch operations to the network service 102. The routine 300 then returns to operation 218, shown in FIG. 2 and described above.

Figure 4:
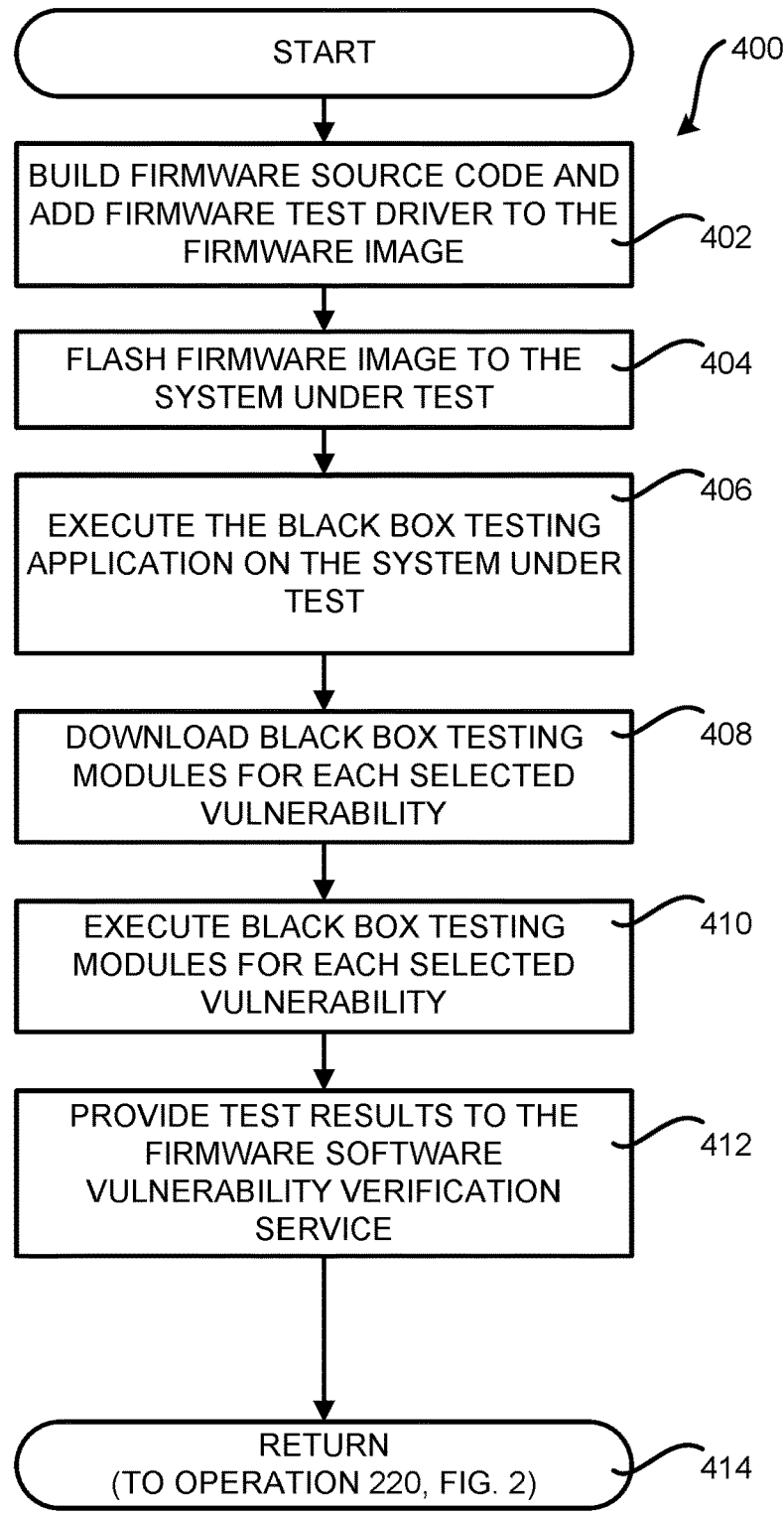
FIG. 4 is a flow diagram that illustrates aspects of the operation of the firmware security vulnerability verification service shown in FIGS. 1A and 1B for performing black box testing on firmware, according to one particular configuration.

FIG. 4 is a flow diagram showing a routine 400 that illustrates aspects of the operation of the firmware security vulnerability verification service 102 shown in FIGS. 1A and 1B for performing black box testing on a firmware 104, according to one particular configuration. The routine 400 begins at operation 402, where the firmware 104 is built and a firmware test driver is added to the firmware image. The firmware image is then stored, or "flashed", to the SUT 126. As also discussed above, the black box testing application 124 can be downloaded from the network service 102 and stored on the SUT 126.

A test driver can be utilized to "amplify" or expose a firmware vulnerability in a more accessible way. For instance, a vulnerability of an interface may cause a system to become unresponsive ("bricking") when exploited. In this example, with the addition of a test driver, the interface can be tested, but the effect on the firmware blocked in order to avoid bricking of the computing system executing the firmware 104. Another example is a vulnerability caused by the usage of improper memory buffers. This type of vulnerability is very difficult to verify from a programmatically point of view, but can be easily verified if functionality is available to validate pointers to the memory buffers internally used by the firmware 104.

From operation 404, the routine 400 proceeds to operation 406, where the black box testing application 124 is executed on the SUT 126. The black box testing application 124 can be a UEFI application, a WINDOWS application, a LINUX application, or an application configured for execution on another operating system. The routine 400 then proceeds from operation 406 to operation 408, where the black box testing application 124 downloads the black box testing modules 130 for each security vulnerability that the firmware 104 is to be tested for. The routine 400 then proceeds from operation 408 to operation 410.

At operation 410, the black box testing application 124 executes the black box testing modules 130 for testing the firmware 104 for the identified security vulnerabilities. Once the black box testing modules 130 have been executed, the black box testing application 124 provides the test results 122B to the service 102. As discussed above, the service 102 can then provide the test results 122B to the user computing device 106 via a web interface or another type of interface. The routine 400 then proceeds from operation 412 to operation 414, where it returns to operation 220, discussed above with regard to FIG. 2.

Figure 5:
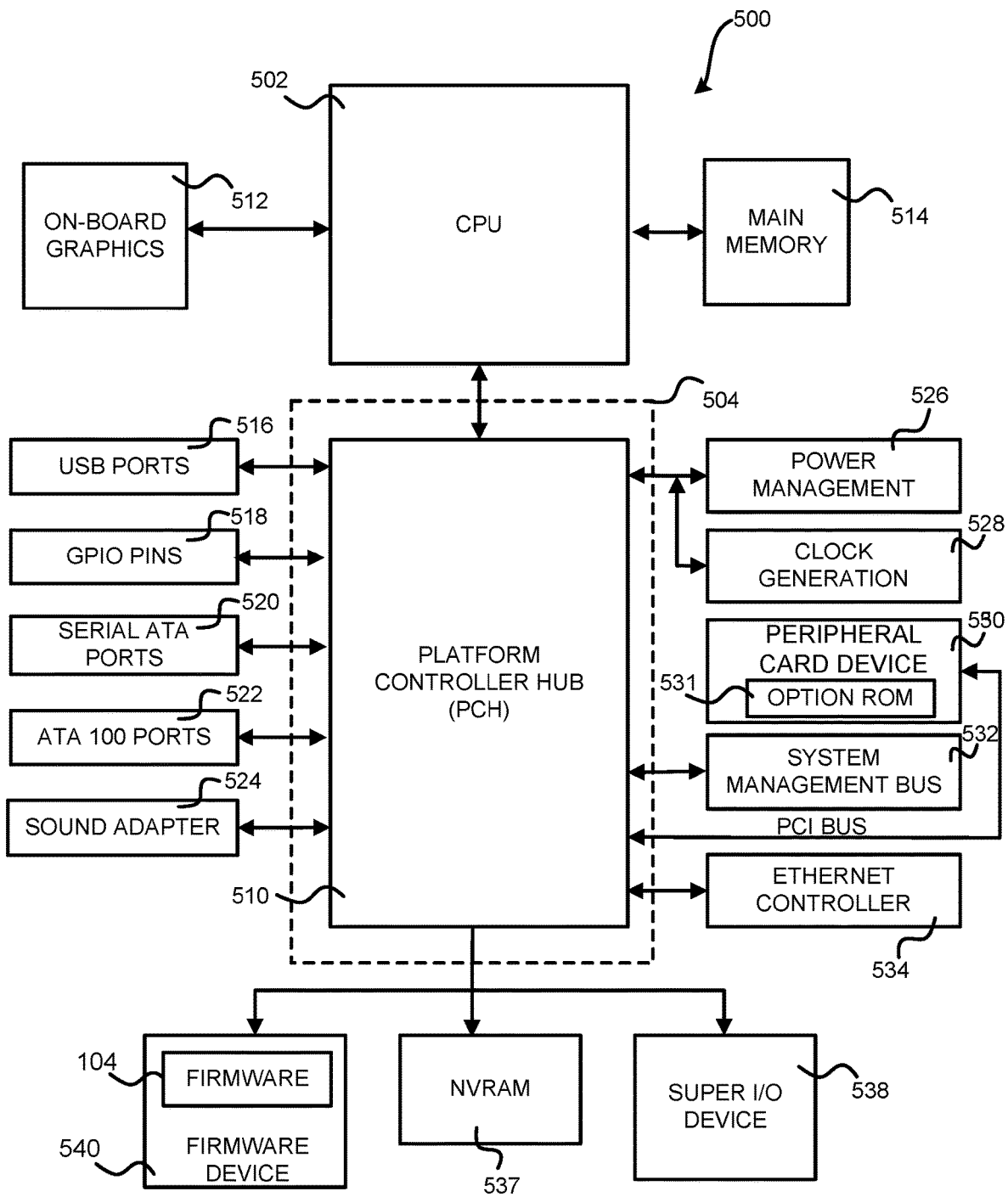
FIG. 5 is a computer architecture diagram that illustrates various components of a computing device that has been configured to provide the functionality disclosed herein.

FIG. 5 is a computer architecture diagram that illustrates various components of a computer 500 that can be configured to provide the functionality disclosed herein. It should be appreciated that although the configurations described herein are discussed primarily in the context of a conventional desktop, laptop, or server computer, the configurations can be utilized with virtually any type of computing device that utilizes a firmware 104, such as a UEFI-compliant firmware, to control aspects of its operation.

In order to provide the functionality described herein, the computer 500 can include a baseboard, or motherboard (not shown in FIG. 5). The motherboard can be a printed circuit board to which some or all of the components shown in FIG. 5 can be connected by way of a system bus or other electrical communication path.

In one illustrative configuration, the motherboard includes one or more central processing units ("CPU") 502 configured to operate in conjunction with a chipset 504. The CPU 502 can be a central processor that performs arithmetic and logical operations necessary for the operation of the computer. For example, the CPU 502 might be a CPU available from INTEL CORPORATION, AMD CORPORATION, or a CPU based upon the ARM architecture from ARM HOLDINGS. Other types of CPUs might also be utilized. In some configurations, the CPU 502 includes an interface to a random access memory ("RAM") used as the main memory 514 in the computer 500 and, possibly, to an on-board graphics adapter 512.

In one implementation, the chipset 504 includes a platform controller hub ("PCH") 510. The PCH 510 provides an interface between the CPU 502 and the remainder of the computer 500. The PCH 510 can also provide functionality for enabling networking communication through an Ethernet controller 534. The Ethernet controller 534 is capable of connecting the computer 500 to another computer via a network. Connections that can be made by the Ethernet controller 534 can include local area network ("LAN") or wide area network ("WAN") connections. LAN and WAN networking environments are commonplace in offices, enterprise-wide computer networks, intranets, and the Internet.

The PCH 510 can also include components for controlling many of the input/output functions of the computer 500. In particular, the PCH 510 can provide one or more universal serial bus ("USB") ports 516, a sound adapter 524, the Ethernet controller 534, and one or more general purpose input/output ("GPIO") pins 518. The PCH 504 can also provide a system management bus 532 for use in managing the various components of the computer 500. Power management circuitry 526 and clock generation circuitry 528 can also be utilized during the operation of the PCH 510.

The PCH 510 can also provide a bus for interfacing peripheral card devices or add-in cards 530, such as a SCSI host bus adapter. In one configuration, the bus comprises a peripheral component interconnect ("PCI") bus. It should be appreciated that other types of add-in cards compliant with other types of bus standards might also be utilized. The add-in card 530 might also include an option ROM 531. As known to those skilled in the art, the option ROM 531 of an add-in card 530 contains program code executable by the CPU 502, such as a firmware driver that is used to connect the device to the system once the option ROM 531 is loaded.

The PCH 510 can also provide one or more interfaces for connecting mass storage devices to the computer 500. For instance, according to an configuration, the PCH 510 includes a serial advanced technology attachment ("SATE") adapter for providing one or more SATA ports 520 and an ATA100 adapter for providing one or more ATA100 ports 522. The SATA ports 520 and the ATA100 ports 522 can be, in turn, connected to one or more mass storage devices (not shown in FIG. 5) storing an OS and application programs. As known to those skilled in the art, an OS comprises a set of programs that control operations of a computer and allocation of resources. An application program is software that runs on top of the OS or firmware and uses computer resources made available through the OS or firmware to perform application-specific tasks.

The mass storage devices connected to the PCH 510 and the SCSI host bus adapter 530, and their associated computer-readable storage media, can provide non-volatile storage for the computer 500. In addition to these mass storage devices, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Encoding the program modules can also transform the physical structure of the storage media. The specific transformation of physical structure can depend on various factors in different implementations of the disclosed technologies. Examples of such factors can include, but are not limited to: the technology used to implement the storage media; whether the storage media are characterized as primary or secondary storage; and the like. For example, if the storage media are implemented as semiconductor-based memory, the program modules can transform the physical state of a semiconductor memory when the software or firmware is encoded therein. In one particular example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

It should be appreciated that the program modules disclosed herein can include software instructions that, when loaded into the CPU 502 and executed, transform a general-purpose computing system into a special-purpose computing system customized to facilitate all, or part of, the operations disclosed herein. As detailed throughout this description, the program modules can provide various tools or techniques by which the computer 500 can participate within the overall systems or operating environments using the components, logic flows, and/or data structures discussed herein.

As also shown in FIG. 5, a low pin count ("LPC") interface can also be provided by the PCH 510 for connecting a "Super I/O" device 538. The Super I/O device 538 is responsible for providing a number of I/O ports, including, but not limited to, a keyboard port, a mouse port, a serial interface, a parallel port, and other types of I/O ports. The LPC interface can also connect a firmware device 102 such as a ROM, EPROM, or a flash memory such as a non-volatile random access memory ("NVRAM") for storing the firmware 104 that includes program code containing the basic routines that help to start up the computer 500 and to transfer information between elements within the computer 500. As discussed above, in one configuration the firmware 104 is a firmware that is compliant with the UEFI Specification.

The LPC interface can also be utilized to connect a NVRAM 537 to the computer 500. The NVRAM 537 can be utilized by the firmware 102 to store configuration data for the computer 500. The configuration data for the computer 500 can also be stored on the same device as the firmware 104 in some configurations.

The computer 500 can be implemented as an embedded control computer, a laptop, a server computer, a mobile device, a set-top box, a kiosk, a tablet or slate computing device, a vehicular information system, a mobile telephone, a customized machine, or other hardware platform. The CPU 502 can be a general purpose processor, a processor core, a multiprocessor, a multi-core processor, a graphics processor, a digital signal processing ("DSP") processor, a customized computing device implemented within an application specific integrated circuit ("ASIC"), a customized computing device implemented within a field programmable gate array ("FPGA"), a customized computing device implemented within any type of programmable logic, a state machine, a reconfigurable processor, any other processing unit, or any combination or multiplicity thereof.

The CPU 502 can be constructed from transistors and/or other circuit elements, which can individually or collectively assume any number of states. More specifically, the CPU 502 can operate as a state machine or finite-state machine. Such a machine can be transformed to a second machine, or a specific machine, by loading executable instructions contained within the program modules. These computer-executable instructions can transform the CPU 502 by specifying how the CPU 502 transitions between states, thereby transforming the transistors or other circuit elements constituting the CPU 502 from a first machine to a second machine, wherein the second machine can be specifically configured to perform the operations disclosed herein. The states of either machine can also be transformed by receiving input from one or more user input devices, network interfaces, other peripherals, other interfaces, or one or more users or other actors. Either machine can also transform states, or various physical characteristics of various output devices such as printers, speakers, video displays, or otherwise.

It should be appreciated that the various technologies disclosed herein can be implemented within other types of computing devices, including hand-held computers, embedded computer systems, smartphones, tablet or slate computing devices, personal digital assistants, or another type of computing device. It is also contemplated that the computer 500 might not include all of the components shown in FIG. 5, can include other components that are not explicitly shown in FIG. 5, or can utilize an architecture completely different than that shown in FIG. 5.

Figure 6:
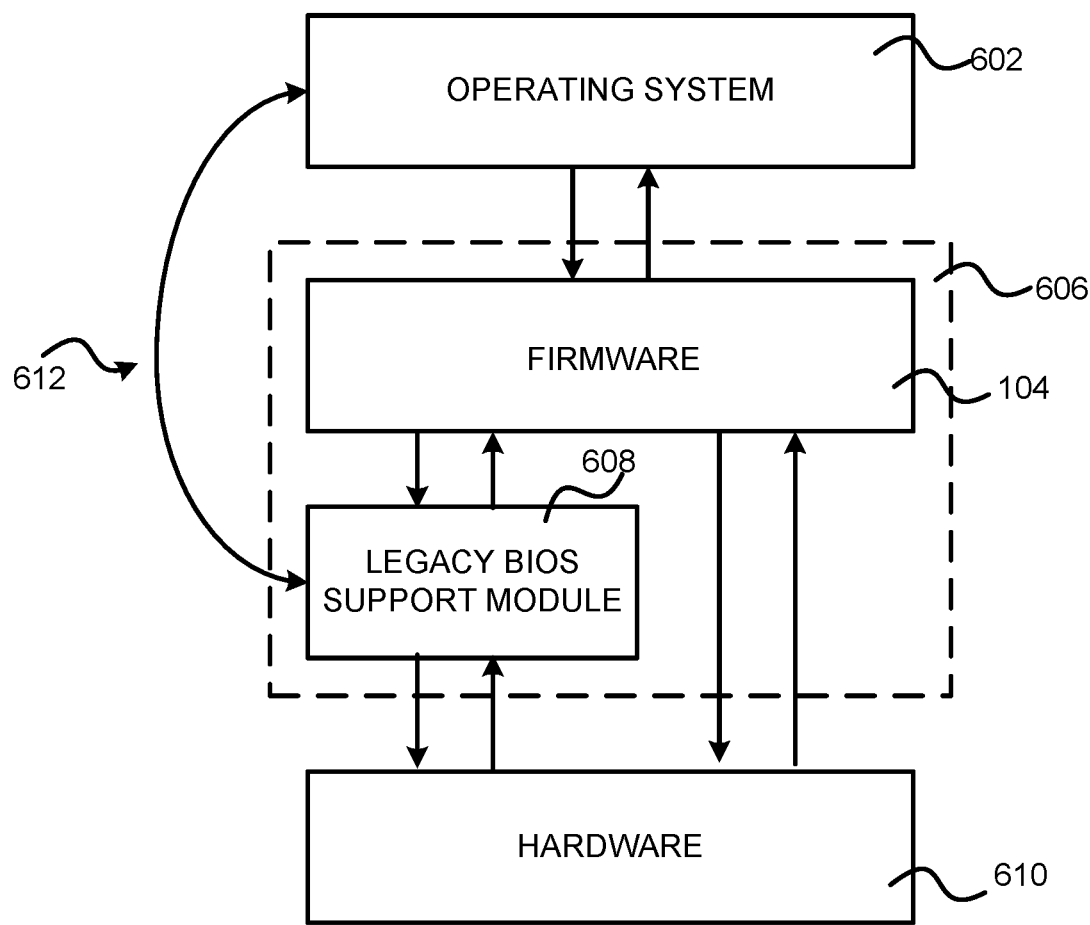
FIG. 6 is a software architecture diagram illustrating aspects of an interface between a Unified Extensible Firmware Interface ("UEFI") Specification-compliant firmware and an operating system according to one or more configurations presented herein.

Referring now to FIG. 6, a software architecture diagram will be described that illustrates aspects of an interface between a firmware 104, such as a UEFI-compliant firmware, and an operating system 602 according to one or more configurations presented herein. The firmware 104 can be implemented as a UEFI-compliant firmware that is compliant with the UEFI Specification. As mentioned above, the term "UEFI Specification" as used herein refers to both the EFI Specification developed by INTEL CORPORATION and the UEFI Specification managed by the UEFI FORUM.

The UEFI Specification describes an interface between the operating system 602 and the firmware 104. The UEFI Specification also defines an interface that the firmware 104 can implement, and an interface that the operating system 602 can use while booting. How the firmware 104 implements the interface can be left up to the manufacturer of the firmware. The UEFI Specification also defines a way for the operating system 602 and firmware 104 to exchange information necessary to support the operating system boot process.

According to some configurations, both a UEFI-compliant firmware 104 and a legacy BIOS support module 608 can be present in the firmware 606. This allows the computer 500 to support a UEFI firmware interface and a legacy BIOS firmware interface. In order to provide this functionality, an interface 612 can be provided for use by legacy operating systems and applications. According to other configurations, only one of the UEFI-compliant firmware 104 and the legacy BIOS support module 608 are present in the firmware 606. According to yet other configurations, the firmware 104 can interface with the platform hardware 610 through any of various other architectures, components, or modules for the firmware without specific involvement of the UEFI-compliant firmware 104 or the legacy BIOS support module 608. Additional details regarding the operation and architecture of a UEFI Specification-compliant firmware can be found in the UEFI Specification which is available from the UEFI Forum, and which is expressly incorporated herein in its entirety.

Figure 7:
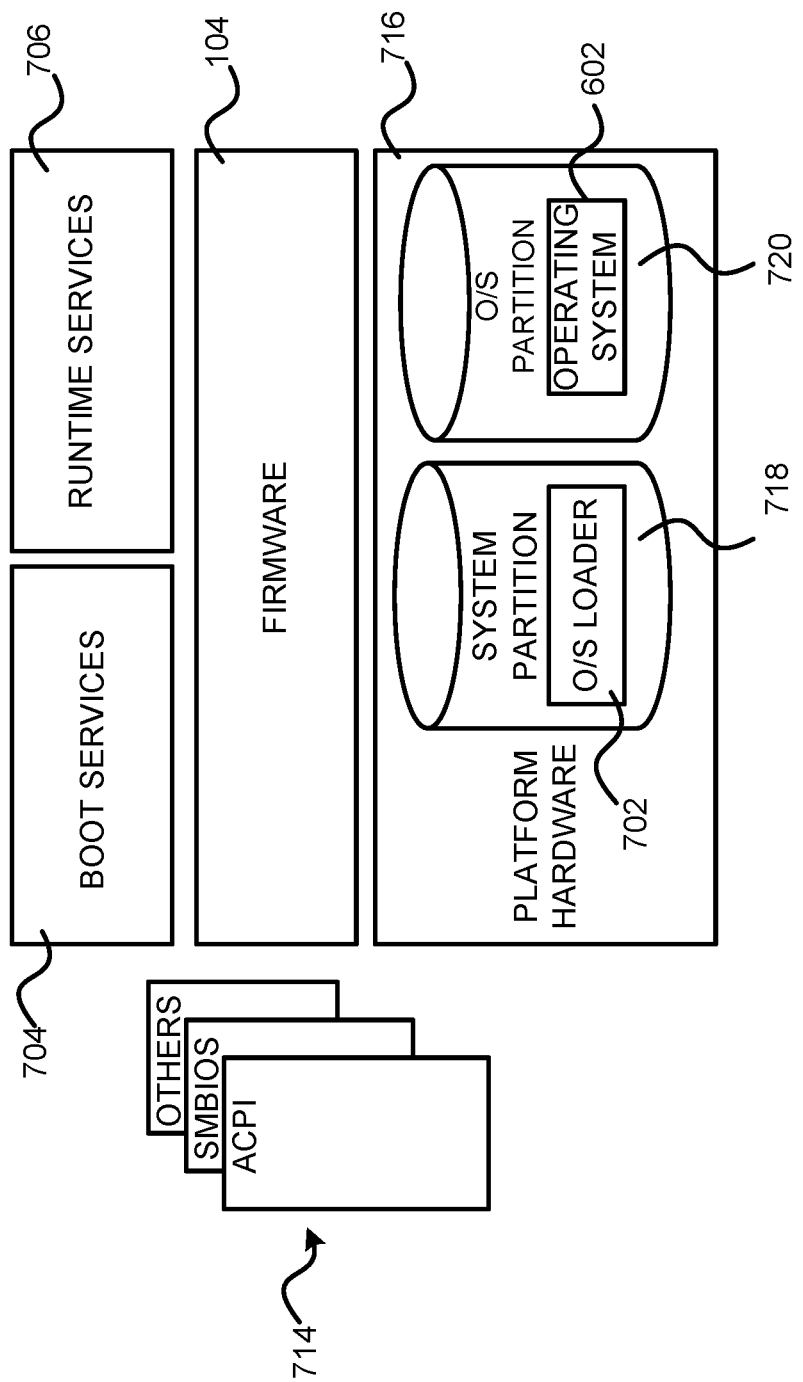
FIG. 7 is a software architecture diagram illustrating an architecture for a UEFI Specification-compliant firmware that provides an operating environment for one or more configurations presented herein.

Turning now to FIG. 7, a block diagram will be described that illustrates an architecture for a UEFI Specification-compliant firmware 104. As shown in FIG. 7, the architecture can include platform hardware 716 and an operating system 602. The firmware 104 can retrieve an operating system ("OS" or "O/S") loader 702 from the UEFI system partition 718, which in turn can load the operating system 602 from the O/S partition 720. The UEFI system partition 718 can be an architecturally shareable system partition that provides a file system designed to support safe sharing of mass storage between multiple vendors. The UEFI Specification defines the structure of the UEFI system partition 718.

Once started, the UEFI OS loader 702 can continue to boot the complete operating system 602. In doing so, the UEFI OS loader 702 can use UEFI boot services 704 and interface to other supported specifications to survey, comprehend, and initialize the various platform components and the operating system software that manages them. Thus, interfaces 714 from other specifications can also be present on the system. For example, the Advanced Configuration and Power Management Interface ("ACPI") and the System Management BIOS ("SMBIOS") specifications can be supported.

UEFI boot services 704 can provide interfaces for devices and system functionality used during boot time. UEFI runtime services 706 can also be available to the UEFI OS loader 702 during the boot phase. For example, a set of run time services can be presented that support variables, time/date, capsule, reset, and the like. UEFI allows extension of platform firmware by loading UEFI driver and UEFI application images which, when loaded, have access to UEFI-defined runtime and boot services. The pre-boot application 106 also has access to these runtime and boot services.

It should be appreciated that technologies have been disclosed herein for providing a firmware security vulnerability verification service. It should also be appreciated that while the subject matter presented herein has been described primarily in the context of a UEFI Specification-compliant firmware 104, it is to be understood that the configurations disclosed herein are not limited to use with a UEFI Specification-compliant firmware. Similar configurations can be utilized with other types of firmware, such as a firmware compliant with the OPEN FIRMWARE specification or another type of open or proprietary firmware.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes can be made to the subject matter described herein without following the example configurations illustrated and described, and without departing from the true spirit and scope of the present invention, which is set forth in the following claims.

What is claimed is:

1. A computer-implemented method for identifying security vulnerabilities in a firmware, comprising:
   receiving, at a network service, data including an identifier for a security vulnerability in a firmware;
   generating, by the network service, a first application for testing source code for the firmware for the security vulnerability, wherein generating the first application comprises adding an identifier for the security vulnerability to the first application; and
   generating, by the network service, a second application for testing the firmware for the security vulnerability, wherein generating the second application comprises adding the identifier to the second application.

2. The computer-implemented method of claim 1, further comprising transmitting the first application and the second application to a user computing device.

3. The computer-implemented method of claim 2, further comprising in response to receiving the data, querying a licensing service to determine that the user computing device is authorized to utilize the network service prior to generating the first application and the second application.

4. The computer-implemented method of claim 1, wherein the first application is configured to:
   obtain second source code associated with the security vulnerability;
   execute revoke patch operations on the source code for revoking the second source code; and
   identify a second security vulnerability associated with a failed operation of the revoke patch operations as being present in the firmware.

5. The computer-implemented method of claim 4, wherein the first application is further configured to provide results of execution of the revoke patch operations to the network service.

6. The computer-implemented method of claim 5, wherein the second application is configured to:
   obtain a module for testing the firmware for the security vulnerability; and
   execute the module to test the firmware for the security vulnerability.

7. The computer-implemented method of claim 6, wherein the second application is further configured to provide results of the execution of the module to the network service.

8. The computer-implemented method of claim 7, wherein the network service is configured to provide, to a computing device remotely located relative to the network service, a result of execution of the revoke patch operations and a result of execution of the module.

9. A non-transitory computer-readable storage medium having computer-executable instructions stored thereupon which, when executed by a computer, cause the computer to:
   receive data including an identifier for a security vulnerability in a firmware;
   generate a first application for testing source code for the firmware for the security vulnerability, wherein generating the first application comprises adding an identifier for the security vulnerability to the first application; and
   generate a second application for testing the firmware for the security vulnerability, wherein generating the second application comprises adding the identifier to the second application.

10. The computer-readable storage medium of claim 9, wherein execution of the instructions further causes the computer to provide at least one of the first application or the second application to a user computing device remotely located relative to the computer.

11. The computer-readable storage medium of claim 9, wherein execution of the instructions further causes the computer to query a licensing service, in response to receiving the data, to determine that the user computing device is authorized to utilize a network service provided by the computer prior to generating the first application and the second application.

12. The computer-readable storage medium of claim 9, wherein the first application is configured to:
   obtain second source code associated with the security vulnerability;
   execute revoke patch operations on the source code for revoking the second source code; and identify a second security vulnerability associated with a failed operation of the revoke patch operations as being present in the firmware.

13. The computer-readable storage medium of claim 12, wherein the first application is further configured to provide results of execution of the revoke patch operations to the computer.

14. The computer-readable storage medium of claim 13, wherein the second application is configured to:
   obtain a module for testing the firmware for the security vulnerability; and
   execute the module to test the firmware for the security vulnerability.

15. The computer-readable storage medium of claim 14, wherein the second application is further configured to provide results of the execution of the module to the computer.

16. The computer-readable storage medium of claim 15, wherein a network service provided by the computer is configured to send, to a user computing device remotely located relative to the computer, a result of execution of the revoke patch operations and a result of execution of the module.

17. An apparatus comprising:
   at least one processor; and
   at least one memory device having instructions stored thereupon which, when executed by the at least one processor, cause the apparatus to:
      receive data including an identifier for a security vulnerability in a firmware;
      generate a first application for testing source code for the firmware for the security vulnerability, wherein generating the first application comprises adding an identifier for the security vulnerability to the first application; and
      generate a second application for testing the firmware for the security vulnerability, wherein generating the second application comprises adding the identifier to the second application.

18. The apparatus of claim 17, wherein execution of the instructions further causes the at least one processor to provide at least one of the first application or the second application to a user computing device.

19. The apparatus of claim 17, wherein the first application is configured to:
   obtain second source code associated with the security vulnerability;
   execute revoke patch operations on the source code for revoking the second source code; and
   identify a second security vulnerability associated with a failed operation of the revoke patch operations as being present in the firmware.

20. The apparatus of claim 17, wherein the second application is configured to:
   obtain a module for testing the firmware for the security vulnerability; and
   execute the module to test the firmware for the security vulnerability.

\* \* \* \* \*